US012800433B2

(12) United States Patent
Blackburn et al.

(10) Patent No.: US 12,800,433 B2
(45) Date of Patent: Nov. 17, 2026

(54) CHARACTERIZATION DEVICE FOR GRADIENT PHOTOCHROMIC LENS

(71) Applicant: Transitions Optical, Ltd., Tuam (IE)

(72) Inventors: Forrest R. Blackburn, Monroeville, PA (US); Joseph C. Stitt, Tuam (IE); Konrad Walsh, Tuam (IE)

(73) Assignee: Transitions Optical, Ltd., Tuam (IE)

( * ) Notice: Subject to any disclaimer, the term of this patent is extended or adjusted under 35 U.S.C. 154(b) by 166 days.

(21) Appl. No.: 18/293,060

(22) PCT Filed: Jul. 30, 2021

(86) PCT No.: PCT/EP2021/071451

§ 371 (c)(1),
(2) Date: Jan. 29, 2024

(87) PCT Pub. No.: WO2023/006220

PCT Pub. Date: Feb. 2, 2023

(65) Prior Publication Data

US 2024/0344927 A1 Oct. 17, 2024

(51) Int. Cl.
*G01M 11/02* (2006.01)

(52) U.S. Cl.
CPC .... *G01M 11/0214* (2013.01); *G01M 11/0285* (2013.01)

(58) Field of Classification Search
CPC ......... G01M 11/0214; G01M 11/0285; G01M 11/0207; G09B 23/22; G01N 21/958; G01N 21/59; G01N 2201/9583; G01N 2201/063; G01N 2201/598
See application file for complete search history.

(56) References Cited

U.S. PATENT DOCUMENTS

| | | | | |
|---|---|---|---|---|
| 5,989,462 | A * | 11/1999 | Buazza | B29D 11/00442 264/1.36 |
| 2003/0049342 | A1 | 3/2003 | Foreman et al. | |
| 2006/0132761 | A1* | 6/2006 | Hall | G01M 11/0207 356/124 |
| 2011/0133672 | A1* | 6/2011 | Tsang | F21V 9/40 315/294 |

(Continued)

FOREIGN PATENT DOCUMENTS

| | | | |
|---|---|---|---|
| EP | 3290892 | A1 | 3/2018 |
| JP | 2007285985 | A | 11/2007 |

(Continued)

*Primary Examiner* — Sang H Nguyen
(74) *Attorney, Agent, or Firm* — The Webb Law Firm

(57) ABSTRACT

An apparatus configured for determining transmittance of a photochromic optical article including at least one photochromic material including a housing defining an interior configured to receive the optical article, the housing including a holding member to hold the optical article at a predetermined position, at least one source of actinic radiation configured to radiate actinic radiation into the interior of the housing and activate at least one photochromic material in the photochromic optical article, at least one image capture device configured to capture image data of the photochromic optical article, at least one backlighting unit positioned beneath the holding member, and a control unit operatively connected to the at least one image capture device and the at least one source of actinic radiation.

14 Claims, 9 Drawing Sheets

(56) References Cited

U.S. PATENT DOCUMENTS

| | | | | |
|---|---|---|---|---|
| 2015/0343102 | A1* | 12/2015 | Romo | A61L 2/10 436/1 |
| 2016/0161403 | A1* | 6/2016 | Sugimoto | G01M 11/0228 356/124 |
| 2017/0122836 | A1* | 5/2017 | Kamei | G02B 1/18 |
| 2017/0157279 | A1* | 6/2017 | Dayton | G03C 1/733 |
| 2018/0299345 | A1* | 10/2018 | Koenig, II | G01N 21/8803 |
| 2019/0291128 | A1* | 9/2019 | Zezinka | B29D 11/00923 |
| 2021/0055217 | A1* | 2/2021 | Blackburn | G02C 7/102 |
| 2022/0122485 | A1* | 4/2022 | Carpenter | G09B 23/22 |

FOREIGN PATENT DOCUMENTS

| | | | |
|---|---|---|---|
| JP | 2010170602 | A | 8/2010 |
| JP | 2011169867 | A | 9/2011 |
| JP | 202159681 | A | 4/2021 |
| JP | 2021059681 | A | 4/2021 |
| WO | 2020156669 | A1 | 8/2020 |

* cited by examiner

CHARACTERIZATION DEVICE FOR GRADIENT PHOTOCHROMIC LENS

CROSS REFERENCE TO RELATED APPLICATION

This application is the United States national phase of International Patent Application No. PCT/EP2021/071451 filed Jul. 30, 2021, the disclosure of which is hereby incorporated by reference in its entirety.

BACKGROUND OF THE INVENTION

Field of the Invention

The present disclosure is directed to, in general, a characterization device for an optical article and, in particular, a characterization device for measuring a gradient on a photochromic lens.

Description of Related Art

Optical elements that absorb electromagnetic radiation in the visible region of the electromagnetic spectrum are used in a variety of articles, such as ophthalmic lenses for spectacles and sunglasses, and for contact lenses. Electromagnetic radiation absorbing ophthalmic lenses improve the viewing comfort of the wearer and enhance the wearer's ability to see in bright conditions. Examples of electromagnetic radiation absorbing ophthalmic lens include fixed tint ophthalmic lenses and photochromic ophthalmic lenses.

Photochromic lenses change tint in response to certain wavelengths of electromagnetic radiation. Photochromic lenses provide the wearer with improved vision and comfort when exposed to bright light conditions but return to a non-absorbing or lesser-absorbing state in low light conditions. Photochromic lenses provide comfort and ease of viewing over a range of lighting conditions and eliminate the need for switching between pairs of spectacles when moving between indoor/low light and outdoor/bright light locations.

Known methods for testing or quantifying the amount of light transmitted by ophthalmic lenses, such as photochromic ophthalmic lenses, utilize a conventional optical bench under laboratory conditions. The photochromic lens is activated, typically by exposure to ultraviolet radiation, and is affixed to the optical bench for testing. While optical benches are well-suited for uniform photochromic distributions across an article, the systems are configured to average transmittance data across the entire lens. Variations in optical characteristics, such as aesthetic characteristics, gradients or patterns cannot be quantified.

The ability to accurately determine optical characteristics of an ophthalmic lens, e.g., an activated photochromic ophthalmic lens, has several applications including in quality control and in marketing. Testing photochromic ophthalmic lenses under predetermined and consistent conditions provides useful data on the comfort and reliability experienced by a wearer. Additionally, the ability to accurately determine characteristics of photochromic ophthalmic lenses may provide purchasers with a quantifiable or qualifiable basis by which to judge various photochromic ophthalmic lenses for use in their geographic location or for their desired purpose.

Thus, it would be desirable to provide a method and/or system for measuring optical characteristics of transparent articles, such as a photochromic ophthalmic article, under quantitative and consistent conditions.

SUMMARY OF THE INVENTION

In one embodiment or aspect of the present disclosure, an apparatus configured for determining transmittance of a photochromic optical article comprising at least one photochromic material may include a housing defining an interior configured to receive the optical article, the housing comprising a holding member to hold the optical article at a predetermined position; at least one source of actinic radiation configured to radiate actinic radiation into the interior of the housing and activate at least one photochromic material in the photochromic optical article; at least one image capture device configured to capture image data of the photochromic optical article; at least one backlighting unit positioned beneath the holding member to emit light towards the image capture device and through the optical article; and a control unit operatively connected to the at least one image capture device and the at least one source of actinic radiation, wherein the control unit is configured to determine transmittance of visible light through the photochromic optical article using the image data captured by the image capture device.

In one embodiment or aspect of the present disclosure, the control unit may be configured to activate the at least one image capture device to capture at least one of a first image data prior to activation of the at least one photochromic material in the photochromic optical article, a second image data after the at least one photochromic material in the photochromic optical article is activated, and a third image data, by closing a shutter mechanism of the image capture device, either before or after the at least one photochromic material in the photochromic optical article has been activated. The control unit may be configured to compare a first transmittance in a first portion in a first image data captured by the image capture device before the at least one photochromic material in the photochromic optical article has been activated to a second transmittance in the first portion in a second image data captured by the image capture device after the at least one photochromic material in the photochromic optical article has been activated. At least one ultraviolet filter may be positioned between the at least one source of actinic radiation and the holding member and in-line with the image capture device, the ultraviolet filter being reflective of at least a portion of wavelengths comprising the actinic radiation. The holding member may be positioned in a temperature-controlled box defined in the interior of the housing, the temperature-controlled box further comprising at least one temperature control component, wherein the at least one temperature control component is configured to maintain a predetermined temperature within the temperature-controlled box. A temperature control unit may be operatively connected to the at least one temperature control component, wherein the temperature control unit is configured to set the predetermined temperature within the temperature-controlled box and set a temperature output of the at least one temperature control component. The at least one temperature control component may be configured to maintain a temperature in the range of −20 °C to 50 °C in the temperature-controlled box. The holding member may include a self-centering chuck configured to secure the optical article. The holding member may be positioned in a drawer that is movable into and out of the temperature-controlled box defined in the interior of the housing. The at least one image capture device may include at least one linear response camera. The photochromic material in the photochromic optical article may be present in a gradient pattern. The control unit may be configured to measure and calculate transmittance of a plurality of sub-regions identified on the photochromic optical article.

In one embodiment or aspect of the present disclosure, a method of determining transmittance of an optical article having at least one photochromic property applied in a gradient pattern on at least one surface of the optical article may include capturing a first image data of a first portion of the gradient pattern on at least one surface of the optical article with at least one image capture device before the gradient pattern is activated; irradiating at least the first portion of the gradient pattern of the optical article with actinic radiation from at least one source of actinic radiation to activate the gradient pattern in the at least one photochromic material; capturing a second image data of the first portion of the gradient pattern on at least one surface of the optical article with at least one image capture device after the gradient pattern has been activated; and calculating, with a processor, the transmittance of visible light through the gradient pattern of the optical article by comparing the first image data to the second image data. The method may further include maintaining a temperature of a temperature-controlled box defined in the interior at a predetermined temperature using a temperature control unit. The method may further include capturing a third image data using the image capture device when a shutter mechanism is closed on the image capture device.

The present invention is also disclosed in the following clauses:

Clause 1: An apparatus configured for determining transmittance of a photochromic optical article comprising at least one photochromic material, the apparatus comprising: a housing defining an interior configured to receive the optical article, the housing comprising a holding member to hold the optical article at a predetermined position; at least one source of actinic radiation configured to radiate actinic radiation into the interior of the housing and activate at least one photochromic material in the photochromic optical article; at least one image capture device configured to capture image data of the photochromic optical article; at least one backlighting unit positioned beneath the holding member to emit light towards the image capture device and through the optical article; and a control unit operatively connected to the at least one image capture device and the at least one source of actinic radiation, wherein the control unit is configured to determine transmittance of visible light through the photochromic optical article using the image data captured by the image capture device.

Clause 2: The apparatus of Clause 1, wherein the control unit is configured to activate the at least one image capture device to capture at least one of a first image data prior to activation of the at least one photochromic material in the photochromic optical article, a second image data after the at least one photochromic material in the photochromic optical article is activated, and a third image data, by closing a shutter mechanism of the image capture device, either before or after the at least one photochromic material in the photochromic optical article has been activated.

Clause 3: The apparatus of Clause 1 or Clause 2, wherein the control unit is configured to compare a first transmittance in a first portion in a first image data captured by the image capture device before the at least one photochromic material in the photochromic optical article has been activated to a second transmittance in the first portion in a second image data captured by the image capture device after the at least one photochromic material in the photochromic optical article has been activated.

Clause 4: The apparatus of any of Clauses 1-3, further comprising at least one ultraviolet filter positioned between the at least one source of actinic radiation and the holding member and in-line with the image capture device, the ultraviolet filter being reflective of at least a portion of wavelengths comprising the actinic radiation.

Clause 5: The apparatus of any of Clauses 1-4, wherein the holding member is positioned in a temperature-controlled box defined in the interior of the housing, the temperature-controlled box further comprising at least one temperature control component, wherein the at least one temperature control component is configured to maintain a predetermined temperature within the temperature-controlled box.

Clause 6: The apparatus of Clause 5, further comprising a temperature control unit operatively connected to the at least one temperature control component, wherein the temperature control unit is configured to set the predetermined temperature within the temperature-controlled box and set a temperature output of the at least one temperature control component.

Clause 7: The apparatus of Clause 5 or Clause 6, wherein the at least one temperature control component is configured to maintain a temperature in the range of 0 °C to 50 °C in the temperature-controlled box.

Clause 8: The apparatus of any of Clauses 1-7, wherein the holding member comprises a self-centering chuck configured to secure the optical article.

Clause 9: The apparatus of claim any of Clauses 5-8, wherein the holding member is positioned in a drawer that is movable into and out of the temperature-controlled box defined in the interior of the housing.

Clause 10: The apparatus of any of Clauses 1-9, wherein the at least one image capture device comprises at least one linear response camera.

Clause 11: The apparatus of any of Clauses 1-10, wherein the photochromic material in the photochromic optical article is present in a gradient pattern.

Clause 12: The apparatus of any of Clauses 1-11, wherein the control unit is configured to measure and calculate transmittance of a plurality of sub-regions identified on the photochromic optical article.

Clause 13: A method of determining transmittance of an optical article having at least one photochromic property applied in a gradient pattern on at least one surface of the optical article, the method comprising: capturing a first image data of a first portion of the gradient pattern on at least one surface of the optical article with at least one image capture device before the gradient pattern is activated; irradiating at least the first portion of the gradient pattern of the optical article with actinic radiation from at least one source of actinic radiation to activate the gradient pattern in the at least one photochromic property; capturing a second image data of the first portion of the gradient pattern on at least one surface of the optical article with at least one image capture device after the gradient pattern has been activated; and calculating, with a processor, the transmittance of visible light through the gradient pattern of the optical article by comparing the first image data to the second image data.

Clause 14: The method of Clause 13, further comprising maintaining a temperature of a temperature-controlled box defined in the interior at a predetermined temperature using a temperature control unit.

Clause 15: The method of Clause 13 or Clause 14, further comprising capturing a third image data using the image capture device when a shutter mechanism is closed on the image capture device.

Clause 16: The apparatus of any of Clauses 1-12, wherein the at least one source of actinic radiation is positioned out-of-line with the at least one image capture device within the interior of the housing.

DESCRIPTION OF THE INVENTION

Figure 1:
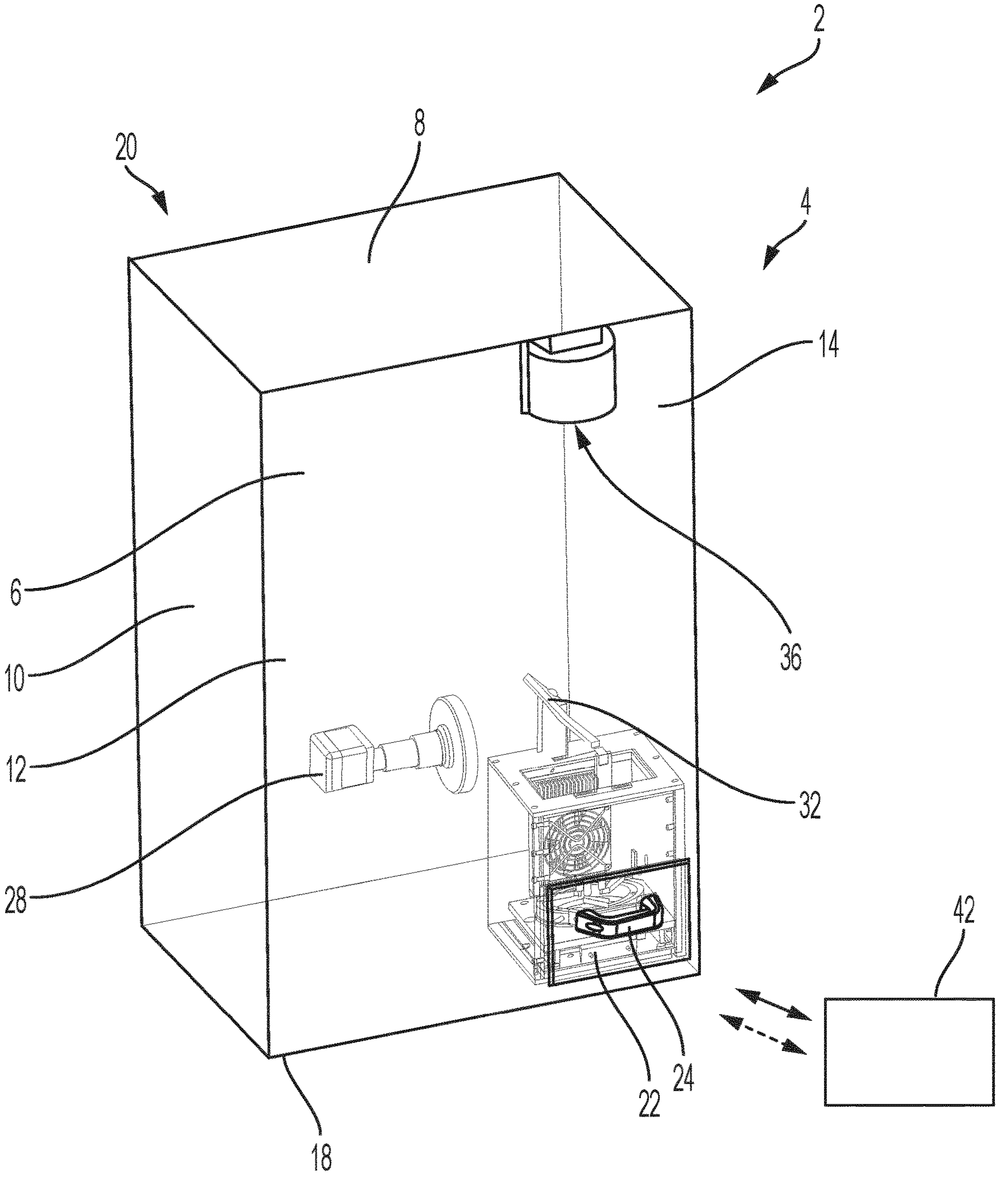
FIG. 1 is a perspective view of an optical article characterization device according to one non-limiting embodiment or aspect of the present disclosure.
Figure 2:
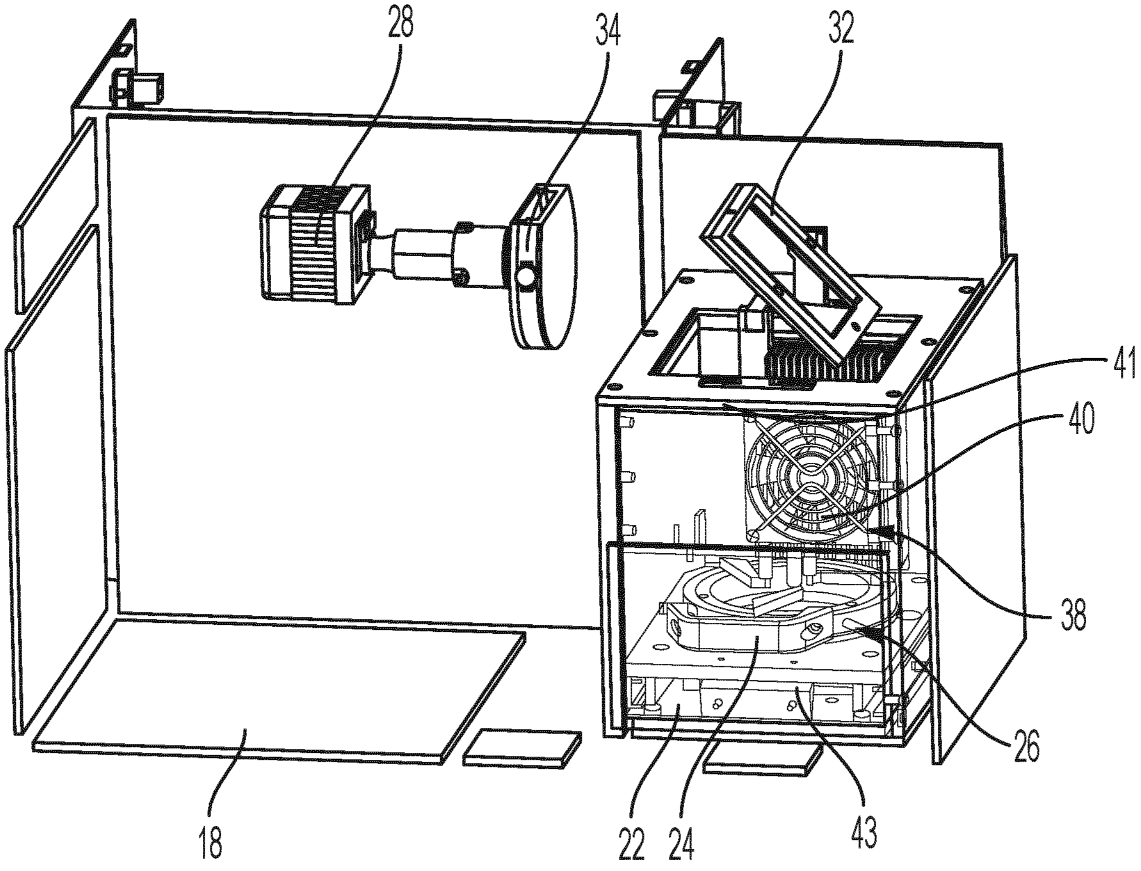
FIG. 2 is an isolated perspective view of the interior of the optical article characterization device of FIG. 1.
Figure 3:
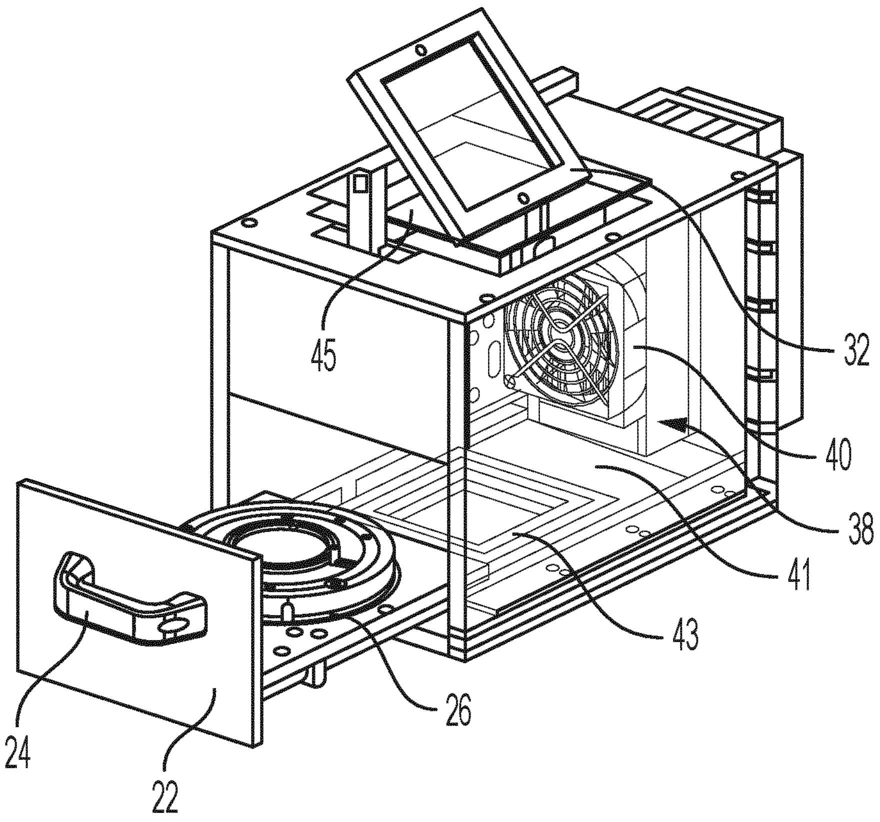
FIG. 3 is another perspective view of a temperature-controlled box of the optical article characterization device of FIG. 1.
Figure 4:
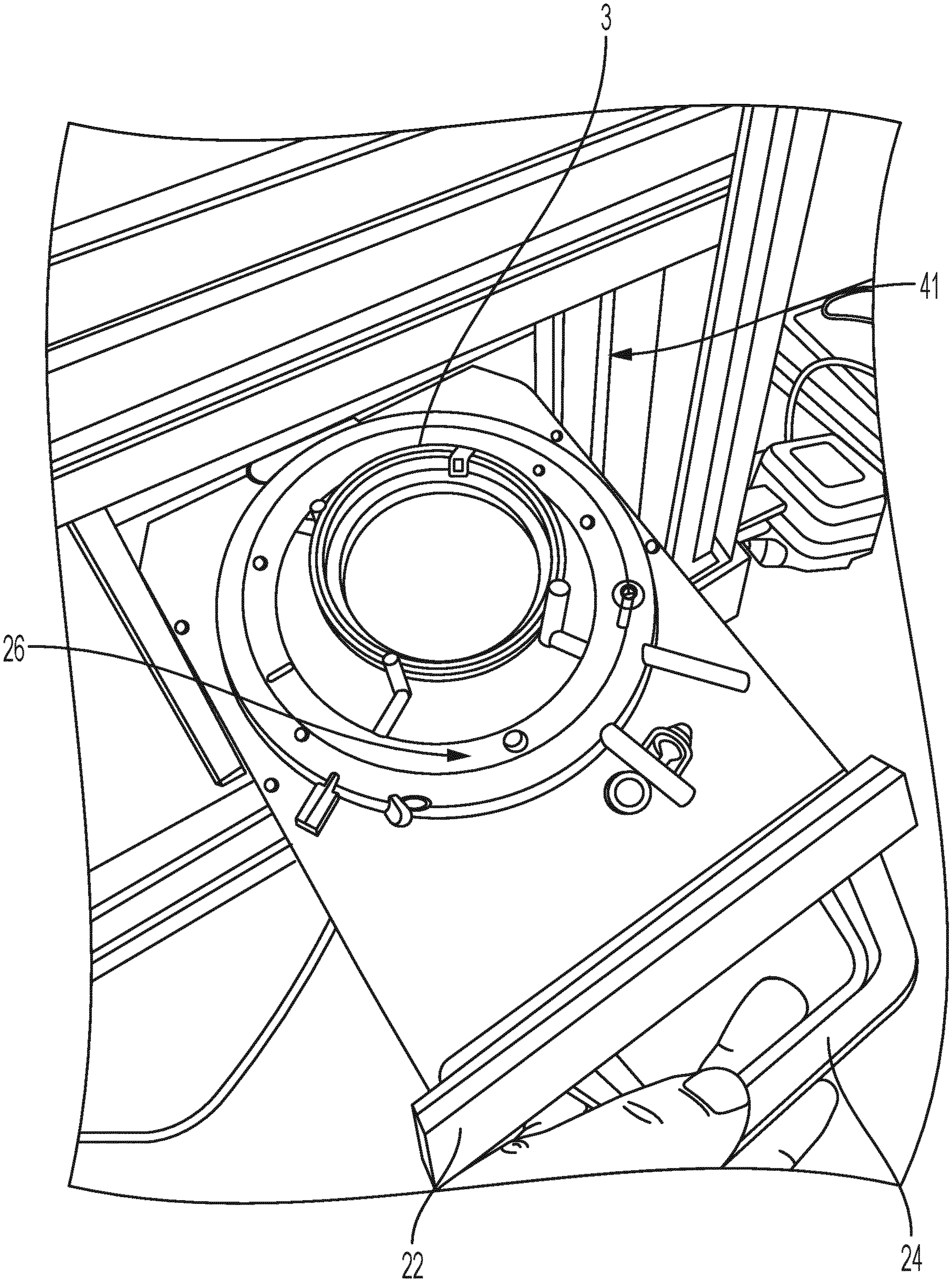
FIG. 4 is a perspective view of a holding member and drawer of the optical article characterization device of FIG. 1.
Figure 5A:
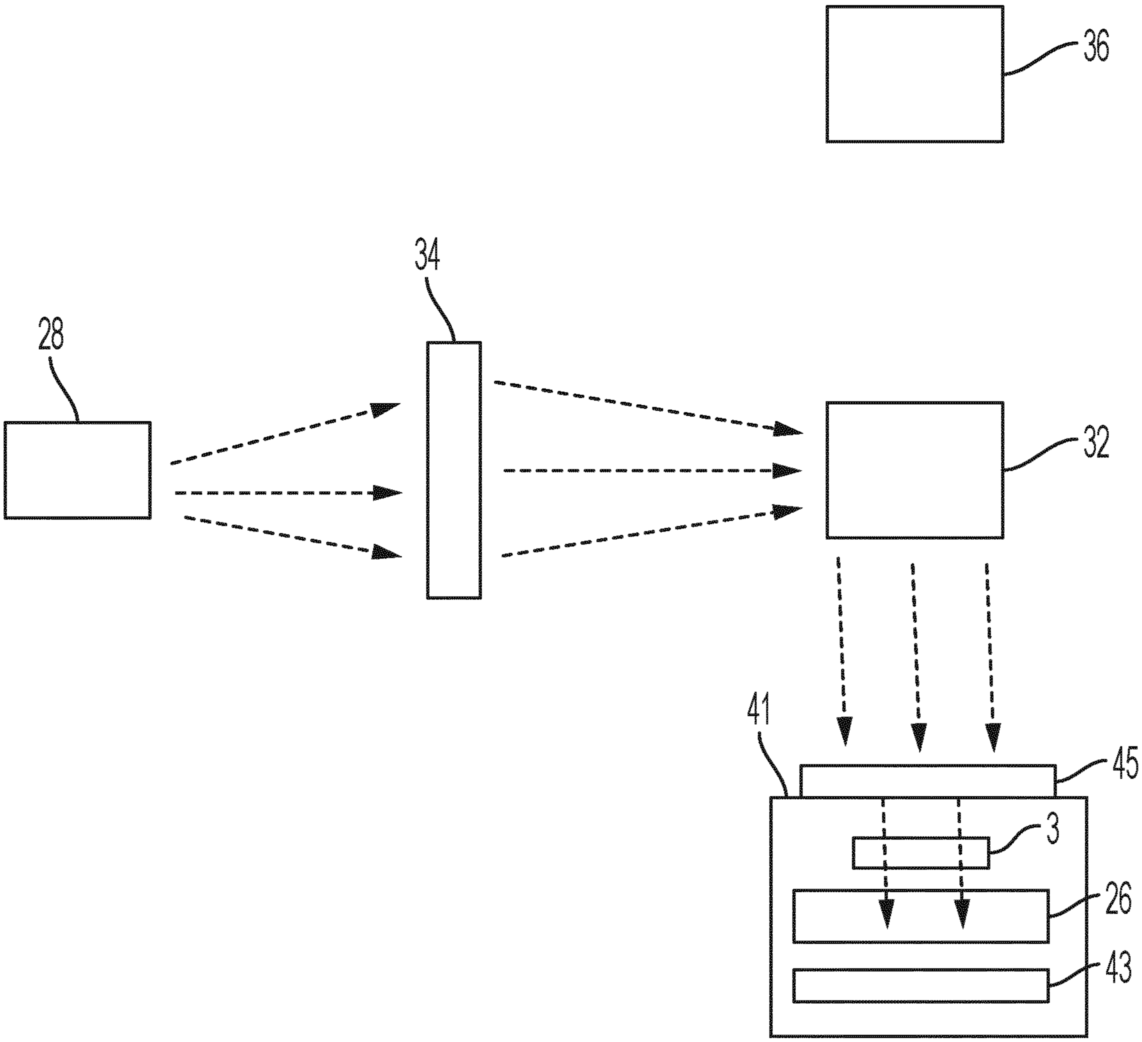
FIG. 5A is a schematic illustration of the interior components of the optical article characterization device of FIG. 1 with a source of actinic radiation activated.
Figure 5B:
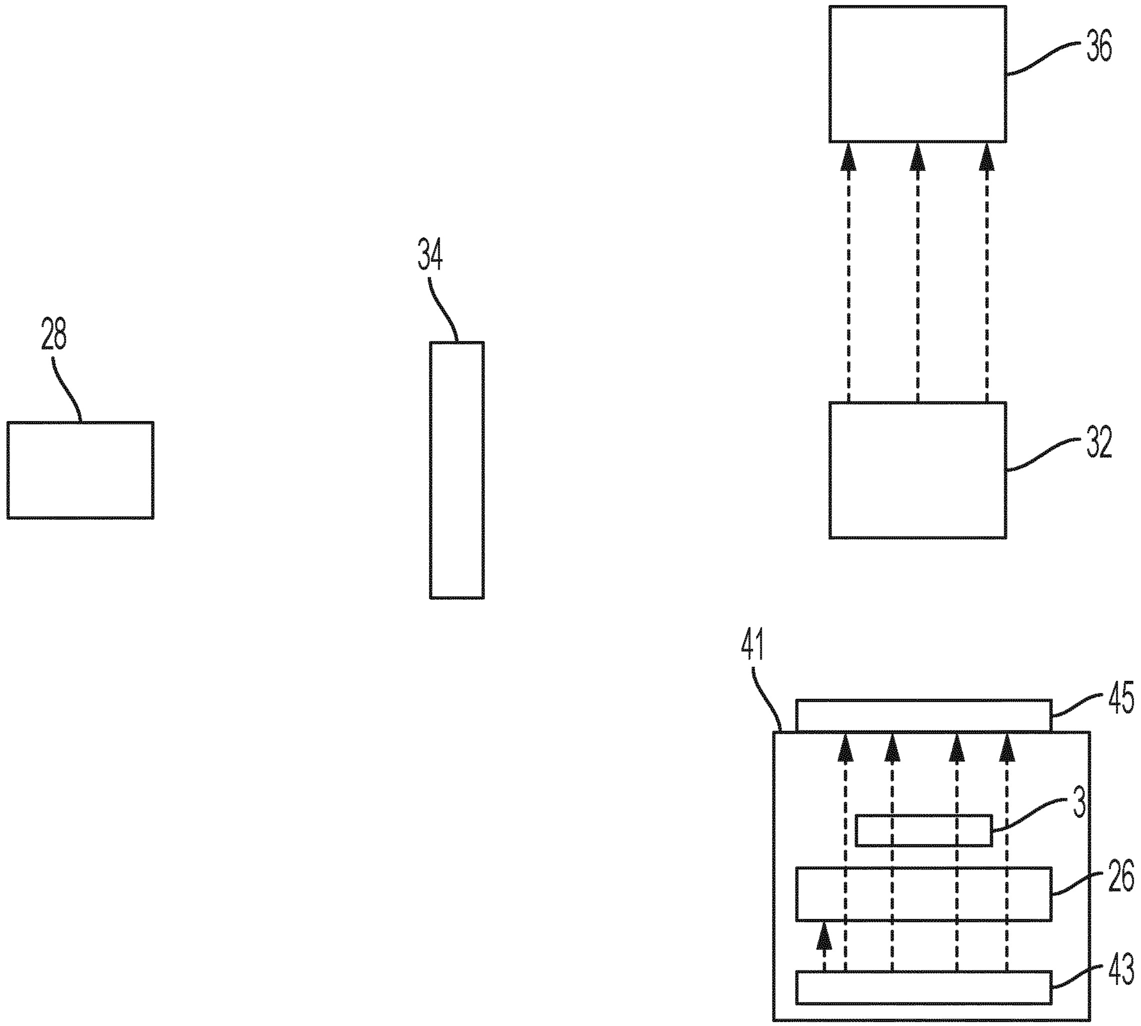
FIG. 5B is a schematic illustration of the interior components of the optical article characterization device of FIG. 1 with backlighting activated.
Figure 6:
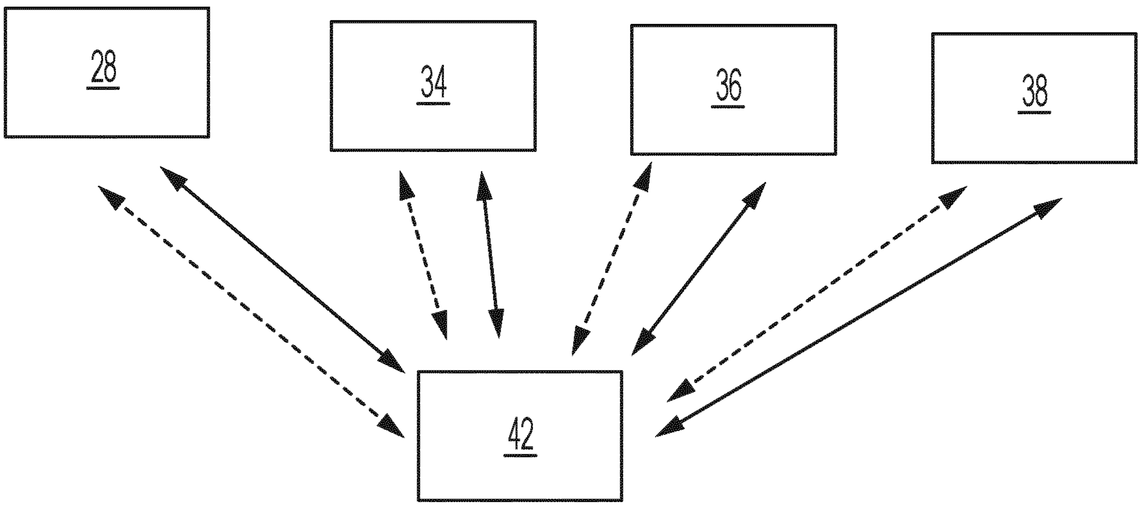
FIG. 6 is a schematic illustration of the electrical connection between the interior components of the optical article characterization device of FIG. 1.

The illustrations generally show preferred and non-limiting embodiments or aspects of the systems and methods of the present disclosure. While the description presents various embodiments or aspects of the devices, it should not be interpreted in any way as limiting the disclosure. Furthermore, modifications, concepts, and applications of the disclosure's embodiments or aspects are to be interpreted by those skilled in the art as being encompassed, but not limited to, the illustrations and description provided herein.

The following description is provided to enable those skilled in the art to make and use the described embodiments or aspects contemplated for carrying out the disclosure. Various modifications, equivalents, variations, and alternatives, however, will remain readily apparent to those skilled in the art. Any and all such modifications, variations, equivalents, and alternatives are intended to fall within the spirit and scope of the present disclosure. Further, for purposes of the description hereinafter, the terms "end", "upper", "lower", "right", "left", "vertical", "horizontal", "top", "bottom", "lateral", "longitudinal", and derivatives thereof shall relate to the disclosure as it is oriented in the figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used in the specification and the claims, the singular form of "a", "an", and "the" include plural referents, unless the context clearly dictates otherwise.

Spatial or directional terms, such as "left", "right", "up", "down", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

The term "such as" is to be understood as being non-limiting. That is, the elements recited after "such as" are to be understood as being non-limiting examples of the recited features.

All ranges disclosed herein encompass the beginning and ending range values and any and all subranges subsumed therein. The ranges disclosed herein represent the average values over the specified range.

The term "includes" is synonymous with "comprises".

The terms "actinic radiation" and "actinic light" mean electromagnetic radiation capable of causing a response in a material, such as transforming a photochromic material from one activation state to another activation state.

As used herein, the terms "ultraviolet", "ultraviolet radiation", "ultraviolet light", and "ultraviolet light spectrum" mean electromagnetic radiation having a wavelength in the range of 100 nm to less than 415 nm. The term "UV" means ultraviolet, such as ultraviolet radiation.

As used herein, the terms "ultraviolet visible" or "UVV" means electromagnetic radiation having a wavelength in the range of 395 nm to less than 455 nm.

As used herein, the term "photochromic" and similar terms, such as "photochromic material", "photochromic compound", or "photochromic coating", means any material or compound having an absorption spectrum for at least visible radiation that varies in response to absorption of at least actinic radiation. A photochromic material includes at least one photochromic compound. The photochromic material or compound may be incorporated into a coating or a film applied to at least one surface of an optical article. Additionally, or alternatively, the photochromic material or compound may be incorporated into the body of the optical article, such as by imbibition or casting into the material of the optical article. The term "photochromic lens" means a lens having a photochromic material associated therewith. The terms "photochromic coating" and "photochromic film" include thermally-reversible and non-thermally reversile photochromic materials and compounds. The term "thermally-reversible photochromic compounds/materials" as used herein means compounds/materials capable of converting from a first state, for example a "colorless state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

The term "optical" means pertaining to or associated with light and/or vision. For example, an optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" means and encompass at least individual lenses, lens pairs, partially formed (or semi-finished) lenses, fully formed (or finished) lenses, and lens blanks.

The term "activated" means that the optical article has been exposed to conditions, such as actinic radiation, and for a sufficient period of time, such that the optical article shifts from a first activation state to a second activation state with respect to at least one optical property, such as the absorption or linear polarization of visible and/or ultraviolet (UV) radiation.

The invention comprises, consists of, or consists essentially of, the following embodiments or aspects of the invention, in any combination. Various embodiments or aspects of the invention are illustrated in separate drawing figures. However, it is to be understood that this is simply for ease of illustration and discussion. In the practice of the invention, one or more embodiments or aspects of the invention shown in one drawing figure can be combined with one or more embodiments or aspects of the invention shown in one or more of the other drawing figures.

With reference to FIGS. 1-5B, a characterization device 2 according to one embodiment or aspect of the present disclosure is shown and described. The characterization device 2 may be configured to determine a transmittance of an optical article 3 having at least one photochromic material applied in a gradient pattern on at least one surface of the optical article 3. In one embodiment or aspect of the present disclosure, the optical article 3 may be a lens having a photochromic material including a gradient pattern that may be activated by actinic radiation. It is to be understood, however, that any photochromic optical article could be measured in this device. It is conceived that defects could be mapped, or non-uniformity of photochromic behavior could be detected using this device 2. The photochromic optical article 3 may exhibit a gradient pattern upon activation, but need not have it in the form of a coating. The optical article 3 could comprise at least one photochromic material present in a gradient pattern, including coatings, imbibed, or laminated with the optical article 3.

In one embodiment or aspect of the present disclosure, the characterization device 2 may include a housing 4 that defines an interior 6 that includes a temperature-controlled box 41 configured to receive the optical article 3. In one embodiment of the present disclosure, the housing 4 may include a top wall member 8, at least four side wall members 10, 12, 14, 16, and a bottom wall member 18 that are operatively connected to one another to form the housing 4. In other embodiments, the housing 4 is any chamber or box that is configured to prevent light from entering the interior of the housing 4. In one embodiment or aspect, the wall members 8-18 are made of a non-transparent material such that outside light sources are not permitted to penetrate the wall members 8-18 into the interior 6 of the housing 4. The wall members 8-18 may be non-reflective. The wall members 8-18 are operatively connected to one another to form the interior 6 of the housing 4. A frame member 20 may be provided to operatively connect the wall members 8-18 to one another.

As shown in FIGS. 1-5B, in one embodiment or aspect of the present disclosure, the housing 4 may include a drawer 22 that is configured to move in and out of a temperature-controlled box 41 that is contained within the interior 6 of the housing 4. The drawer 22 may be configured to receive the optical article 3 for insertion into an interior of the temperature-controlled box 41. An operator may pull a handle 24 operatively connected to the drawer 22 to pull the drawer 22 from the interior of the temperature-controlled box 41. Once the drawer 22 has been pulled from the housing 4, the optical article 3 may be positioned on the drawer 22. The operator may then push the drawer 22 back into the temperature-controlled box 41, thereby positioning the optical article 3 in the interior 6 of the housing 4 inline with an image capture device 36 (described in detail below). It is to be understood that the drawer 22 may be operatively connected to the housing 4 in any sufficient manner so as to allow the drawer 22 to be moved in and out of the interior 6 of the housing 4, include sliding brackets, rollers, and similar mechanical arrangements.

In one embodiment or aspect of the present disclosure, a holding member 26 may be operatively connected to the drawer 22 to hold the optical article 3 on the drawer 22. The holding member 26 may be provided to secure the optical article 3 within the interior 6 of the housing 4 while the transmittance of the optical article 3 is determined. In one embodiment or aspect of the present disclosure, the holding member 26 may be a three-jaw chuck that is configured to hold and secure the optical article 3 on the drawer 22. In one embodiment or aspect of the present disclosure, the holding member 26 may be a self-centering chuck. The three-jaw chuck may be moved between an open position in which the optical article 3 can be placed in the three-jaw chuck and a closed position in which the jaws of the chuck secure the optical article 3 within the three-jaw chuck. The holding member 26 may be provided in the characterization device 2 to ensure that the gradient pattern of the at least one photochromic material is held at a predetermined position when the optical article 3 is held on the drawer 22 in the interior 6 of the housing 4. As will be described below in greater detail, the holding member 26 ensures that the optical article 3 is held in a consistent predetermined location in the housing 4 to ensure effective activation of the photochromic material on the optical article 3. Therefore, by using the holding member 26, the optical article 3 is always positioned in the desired location and orientation in the housing 4, thereby reducing the time and effort needed to ensure the optical article 3 is positioned correctly within the housing 4.

As shown in FIGS. 1-5B, in one embodiment or aspect of the present disclosure, the characterization device 2 also may include at least one source of actinic radiation within the interior 6 of the housing 4. In one embodiment or aspect of the present disclosure, the source of actinic radiation 28 is held stationary so that the source of actinic radiation 28 is always pointed at the same location relative to the holding member 26 that secures the optical article 3.

In one embodiment or aspect of the present disclosure, a single source of actinic radiation 28 is provided in the interior 6 of the housing 4 to activate the gradient pattern of the photochromic material on the optical article 3. It is also contemplated, however, that additional sources of actinic radiation 28 may be provided within the interior 6 of the housing 4. In one embodiment or aspect of the present disclosure, the source of actinic radiation 28 is an ultraviolet light source. It is also contemplated that other sources of actinic radiation may be used within the characterization device 2, such as ultraviolet visible light (UVV) so that the gradient pattern on the photochromic material of the optical article 3 may be activated. The source of actinic radiation 28 is provided in the characterization device 2 to supply and generate actinic radiation within the interior 6 of the housing 4 to activate a photochromic compound in the photochromic material of the optical article 3 to activate the gradient pattern on the optical article 3. In one embodiment or aspect of the present disclosure, the source of actinic radiation 28 emits electromagnetic radiation in the range of 365-415 nm. In one embodiment or aspect of the present disclosure, the source of actinic radiation 28 may be a confocal ultraviolet LED array to eliminate excess vibration during use of the characterization device 2 and to eliminate the need for moving parts, as otherwise some level of automation would be necessary to move the UV light source into/out of the path of the image capture device 36.

In one embodiment or aspect of the present disclosure, the characterization device 2 may also include an ultraviolet filter 32 configured to direct the actinic radiation supplied by the source of actinic radiation 28 towards the optical article 3 held on the holding member 26. The ultraviolet filter 32 may be a reflective cut-off filter. The ultraviolet filter 32 may be configured to reflect all wavelengths in the ultraviolet spectrum, such as wavelengths up to 395 nm, up to 410 nm, or up to 420 nm, for example. The ultraviolet filter 32 may be provided in the characterization device 2 to reflect the actinic radiation provided by the source of actinic radiation 28 to ensure actinic radiation is supplied to the optical article 3 for activating the photochromic material. The ultraviolet filter 32 may be chosen for the characterization device 2 based on the photochromic material that is applied to the optical article 3. In one embodiment of the present disclosure, the ultraviolet filter 32 may be configured to direct the actinic radiation towards the optical article 3 and allow the light from the backlighting unit 43 to pass through the ultraviolet filter 32 towards the image capture device 36 (see FIGS. 5A and 5B). According to the particular photochromic material on the optical article 3, different wavelengths of actinic radiation may need to be supplied to the optical article 3 to activate the photochromic compounds in the photochromic material. It is also contemplated that the ultraviolet filter 32 may be positioned at alternative angles relative to the optical article 3 as desired. In one embodiment or aspect of the present disclosure, the holding member 26 and, therefore, the optical article 3 are positioned beneath the ultraviolet filter 32 such that the optical article 3 is positioned out-of-line with the source of actinic radiation 28. The optical article 3 may not be positioned in a direct line with the source of actinic radiation 28. Instead, the ultraviolet filter 32 is configured to direct the actinic radiation from the source of actinic radiation 28 down to the optical article 3 held on the holding member 26.

In one embodiment or aspect of the present disclosure, a shutter mechanism 34 may also be provided in the characterization device 2 for use in connection with the source of actinic radiation 28. The shutter mechanism 34 may be provided to control how actinic radiation from the source of actinic radiation 28 is directed towards the optical article 3 held in the interior 6 of the housing 4. In one embodiment or aspect of the present disclosure, the shutter mechanism 34 may be moved between a position in which the shutter mechanism 34 is raised and does not block the actinic radiation from being directed towards the optical article 3 and a position in which the shutter mechanism 34 is lowered and blocks the actinic radiation from being directed towards the optical article 3. In another embodiment or aspect of the present disclosure, the shutter mechanism 34 may be moved between a position in which the shutter mechanism 34 is opened allowing the actinic radiation to pass through the shutter mechanism 34 to the optical article 3 and a position in which the shutter mechanism 34 is closed to prevent the actinic radiation from being directed towards the optical article 3. In one embodiment or aspect of the present disclosure, the source of actinic radiation 28, the ultraviolet filter 32, and the shutter mechanism 34 are positioned in line with one another within the interior 6 of the housing 4.

As shown in FIGS. 1-5B, in one embodiment or aspect of the present disclosure, an image capture device 36 is also provided in the characterization device 2. In one embodiment or aspect of the present disclosure, the image capture device 36 may be a linear response camera. However, it is contemplated that alternative types of cameras may be used as the image capture device 36. The image capture device 36 may be operatively connected to the housing 4 within the interior 6 of the housing 4. The image capture device 36 may be held on a bracket within the interior 6 of the housing 4. In one embodiment or aspect of the present disclosure, the image capture device 36 may be configured to capture image or video data of portions of the interior 6 of the housing 4. In particular, the image capture device 36 may be configured to capture mage or video data of the optical article 3 when positioned with in the interior 6 of the housing 4. As will be described in greater detail below, the image capture device 36 is configured to capture image or video data of the optical article 3 at different times during an activation process of the photochromic material on the optical article 3. The image or video data captured by the image capture device 36 may be used to determine the transmittance of the gradient pattern on the optical article 3. In one embodiment or aspect of the present disclosure, the image capture device 36 may be held in a stationary position within the interior 6 of the housing 4. In another embodiment or aspect of the present disclosure, the image capture device 36 may be adjustable within the interior 6 of the housing 4 so that the image capture device 36 may be moved to different positions relative to the optical article 3 held in the housing 4. In one embodiment or aspect of the present disclosure, the image capture device 36 may be positioned in-line with the optical article 3 held in the housing 4 so that the image capture device 36 is positioned directly above the optical article 3.

As shown in FIGS. 1-5B, in one embodiment or aspect of the present disclosure, the characterization device 2 may also include a temperature control component 38 for regulating the temperature within temperature-controlled box 41 of the housing 4 of the characterization device 2. The temperature control component 38 may include at least one temperature control unit 40. The temperature control unit 40 may be operatively connected to the temperature-controlled box 41 such that the temperature control unit 40 may regulate the temperature of the air held in the temperature-controlled box 41 to ensure optimum results are achieved when activating the photochromic material on the optical article 3 held in the temperature-controlled box 41. In one embodiment of the present disclosure, the temperature control component 38 is configured to maintain a temperature in the range of 0 °C to 50 °C in the temperature-controlled box 41. In one embodiment of the present disclosure, the temperature control unit 40 may be a Peltier device. The temperature-controlled box 41 may be operatively connected with the drawer 22. In one embodiment or aspect of the present disclosure, the holding member 26 may be positioned on the drawer 22 and in the temperature-controlled box 41. The temperature control component 38 may be programmed and configured to maintain a predetermined temperature within the temperature-controlled box 41. In one embodiment of the present disclosure, the temperature-controlled box 41 may include a backlighting unit 43 positioned underneath the holding member 26, the holding member 26, the drawer 22, the temperature control unit 40, and a thermocouple or thermistor to measure the temperature of the temperature-controlled box 41. The backlighting unit 43 may be operatively connected to the control unit 42. In one embodiment, a bottom portion of the drawer 22 may be transparent or open, such that when the drawer 22 is closed, the backlighting unit 43 directly below the optical article 3 is not obstructed. In one embodiment, the temperature-controlled box 41 may include a quartz window 45 in line with the image capture device 36/optical article 3/backlighting unit 43 through which the image capture device 36 views the interior of the temperature-controlled box 41. Non-limiting examples of a backlighting unit 43 include a backlit sheet of fabric or plastic, or an LED array. The backlighting unit 43 may be diffusely lit. An exemplary backlighting unit 43 may include a diffuse white-light LED system. The backlighting unit 43 may be the sole light source of the device 2. However, it is to be understood that the device 2 may include additional light sources that are not comprised by the backlighting unit 43.

In one embodiment or aspect of the present disclosure, the temperature control component 38 may be configured to set the predetermined temperature within the temperature-controlled box 41 of the housing 4 and, in turn, set the temperature output of the temperature control unit to provide this predetermined temperature to the temperature-controlled box 41. It is also contemplated, however, that alternative temperature ranges may be used by the temperature control component 38 depending on the type of photochromic lens held in the housing 4. In one embodiment, the characterization device 2 is configured to prevent running a characterization procedure for an optical article 3 until the temperature-controlled box 41 reaches a desired temperature.

With reference to FIGS. 1-5B in one embodiment or aspect of the present disclosure, the characterization device 2 may also include a control unit 42 provided to operate the different components of the characterization device 2. In one embodiment of the present disclosure, the control unit 42 may be a computer having a processor that runs software to perform the control unit 42 actions described below. The control unit 42 may be configured to store data received from the image capture device 36. The control unit 42 may be operatively connected to at least one of the holding member 26, the source of actinic radiation 28, the shutter mechanism 34, the image capture device 36, the backlighting unit 43, and the temperature control component 38 to initiate and/or deactivate operation of each of these components. In one embodiment or aspect of the present disclosure, the control 42 is operatively connected to all of the holding member 26, the source of actinic radiation 28, the shutter mechanism 34, the image capture device 36, the backlighting unit 43, and the temperature control component 38.

In one embodiment or aspect of the present disclosure, the control unit 42 may be directly wired to each of the holding member 26, the source of actinic radiation 28, the shutter mechanism 34, the image capture device 36, and the temperature control component 38 to effect operation of these components. In another embodiment or aspect of the present disclosure, the control unit 42 may be wirelessly connected to each of the holding member 26, the source of actinic radiation 28, the shutter mechanism 34, the image capture device 36, the backlighting unit 43, and the temperature control component 38 to effect operation of these components. The control unit 42 may be positioned on the housing 4 of the characterization device 2 for use by an operator or, alternatively, the control unit 42 may be positioned at a location remote from the characterization device 2 that permits the operator to activate and deactivate the characterization device 2 from a distance. In one embodiment or aspect of the present disclosure, the control unit 42 may be activated using a remote (not shown) at a distance from the characterization device 2. Use of the control unit 42 during operation of the characterization device 2 is described in further detail below.

With reference to FIGS. 1-5B and 8, according to one embodiment or aspect of the present disclosure, the operation and use of the characterization device 2 is described in detail. The characterization device 2 may be used to determine a transmittance of visible light through a photochromic material on a optical article 3 introduced into the characterization device 2. In one embodiment or aspect of the present disclosure, the photochromic material may include a gradient pattern in which different portions of the photochromic material have different transmittance.

Before the optical article 3 is placed in the characterization device 2, the exposure for the image capture device 36 may be calibrated to the intensity of the backlighting unit 43 using standards of known transmittance. The control unit 42 may be used to activate the temperature control component 38 to ensure a predetermined temperature is set for the temperature-controlled box 41. By performing this operation before the optical article 3 is introduced into the characterization device 2, the operator ensures the interior 6 of the housing 4 is set to the desired temperature and minimize the time that would be needed to equilibrate the optical article 3 to the predetermined temperature after the optical article 3 has been introduced into the characterization device. It is also contemplated, however, that the temperature of the temperature-controlled box 41 may also be set after the optical article 3 has been introduced into the characterization device 2. In one embodiment or aspect of the present disclosure, the control unit 42 ensures that the temperature control component 38 maintains the predetermined temperature within the temperature-controlled box 41 throughout the entire operation of the characterization device 2.

Before operation of the characterization device 2 is initiated, the drawer 22 may be pulled from the housing 4 by the operator to secure the optical article 3 on the holding member 26. In one embodiment or aspect of the present disclosure, the three jaw chuck of the holding member 26 may be held in an open position when the optical article 3 is not held on the holding member 26. After the optical article 3 has been placed on the holding member 26, the three jaw chuck may be moved into a closed position to bring the jaws together towards one another to engage and secure the optical article 3 on the holding member 26. Once the optical article 3 has been secured to the holding member 26, the optical article 3 will be positioned at a predetermined position on the holding member 26 such that the optical article 3 will be positioned at a desired location and orientation relative to the image capture device 36 and the source of actinic radiation 28. After the optical article 3 has been secured to the holding member 26, the drawer 22 may be pushed back into the housing 4 by the operator to place the optical article 3 in position for activation of the photochromic material on the optical article 3. All the in-line components are in a fixed position during operation (and the drawer 22 places the optical article 3 in a fixed position when closed). The absence of moving parts eliminates vibration and ensures all the images are clear and in-focus, and the series of images can be compared with locational certainty. The ultraviolet filter 32 may be in line with the image capture device 36 and also fixed, so as not to contribute to unnecessary vibrations, noise, etc.

Once the optical article 3 has been positioned within the interior 6 of the housing 4, the control unit 42 may be used to activate the image capture device 36 to capture image or video of the optical article 3 held on the holding member 26. In one embodiment or aspect of the present disclosure, at least one image is captured by the image capture device 36 before the photochromic material on the optical article 3 has been activated by the source of actinic radiation 28. Before the photochromic material has been activated on the optical article 3, the photochromic material will have a first transmittance through the optical article 3. The backlighting unit 43 emits visible light which is then transmitted through the optical article 3 in both the first (activated) state and the second (non-activated) state.

After the first image of the optical article 3 has been captured by the image capture device 28, the control unit 42 may be used to activate the source of actinic radiation 28 such that actinic radiation is directed at the optical article 3 to activate the photochromic material. In one embodiment of the present disclosure, activation of the optical article 3 may be for a sufficient amount of time to fully activate the photochromic material, for example at least three minutes. In one embodiment or aspect of the present disclosure, the actinic radiation is directed through the ultraviolet filter 32 and then towards the optical article 3 held on the holding member 26. As the actinic radiation contacts the photochromic material on the optical article 3, at least one photochromic compound of the photochromic material is activated, thereby activating the gradient pattern on the optical article 3. After the photochromic material has been activated on the optical article 3, the control unit 42 may be used to active the image capture device 36 to capture image or video data of the optical article 3 held on the holding member 26. Therefore, at this point of operation of the characterization device 2, at least one image of the optical article 3 before the photochromic material has been activated has been captured by the image capture device 36 and at least one image of the optical article 3 after the photochromic material has been activated has been captured by the image capture device 36.

The image capture device 36 may include a shutter mechanism configured to control the amount and duration of exposure. A dark image, described in detail below, may be captured before or after either the first and/or second images have been captured. A dark image is produced by capturing an image with the shutter mechanism of the image capture device 36 closed.

Figure 7:
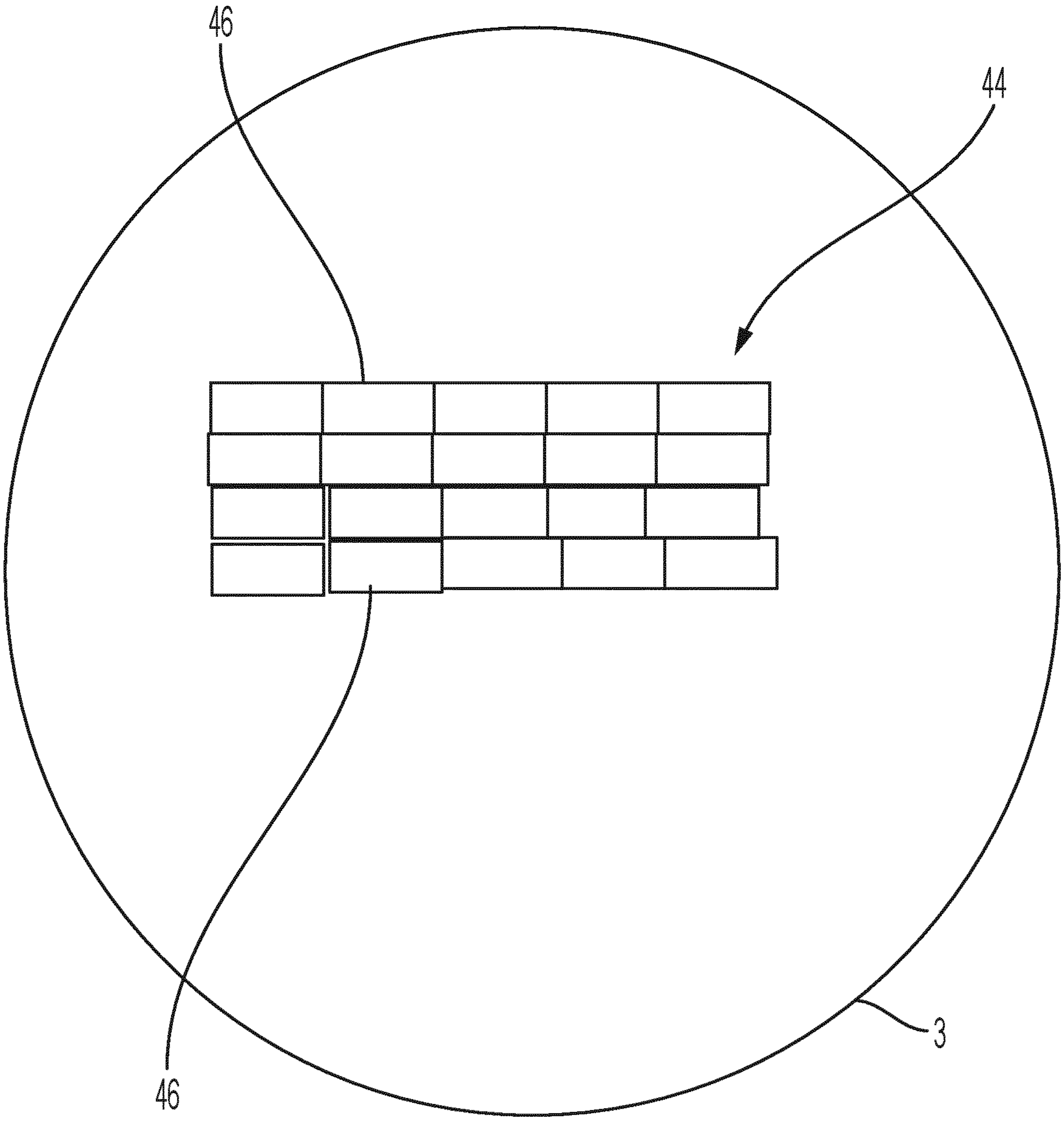
FIG. 7 is a schematic illustration of an optical article with a region and sub-regions for analysis of the transmittance of the optical article according to one embodiment or aspect of the present disclosure.
Figure 8:
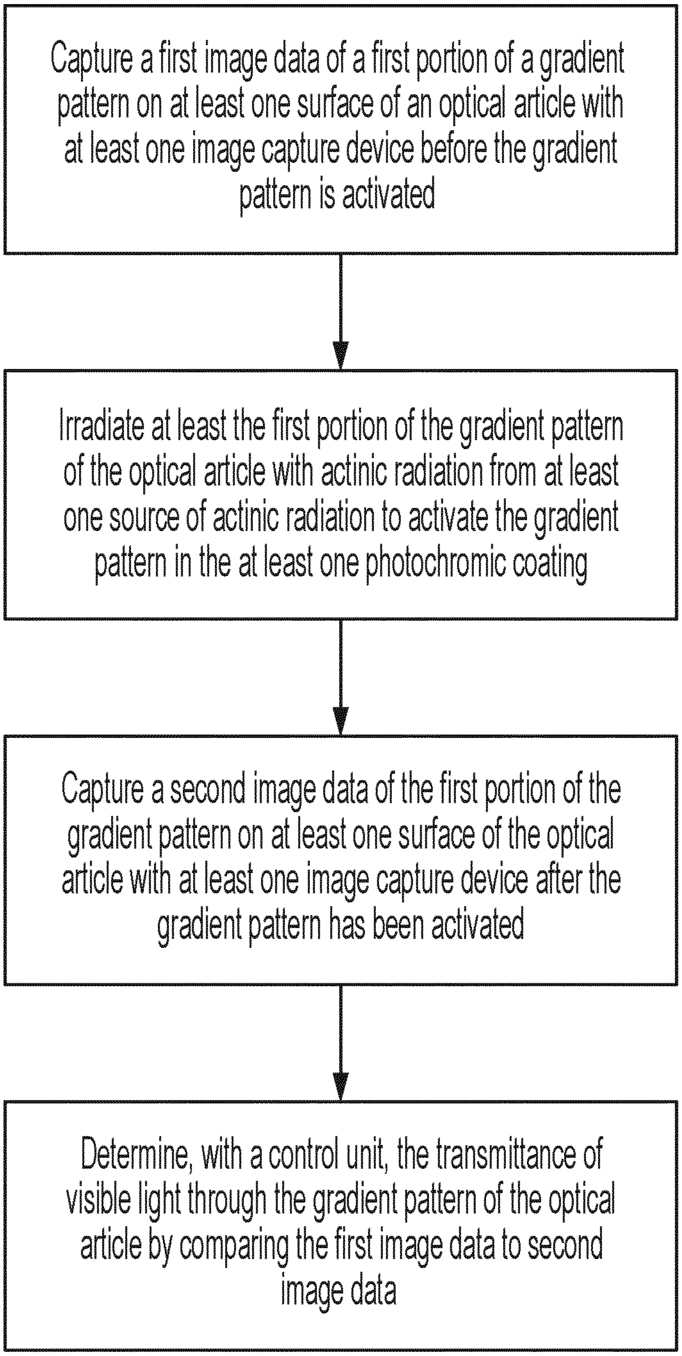
FIG. 8 is a schematic illustration of a method of use of the optical article characterization device of FIG. 1.

After the at least three images have been captured by the image capture device 36, the control unit 42 is configured to remove the dark current reading from each of the at least one image of the optical article 3 taken before the photochromic material has been activated and the at least one image of the optical article 3 taken after the photochromic material has been activated to remove any background interference that was captured by the image capture device 36. As shown in FIG. 7, once the dark current has been eliminated from the images, the control unit 42 is programmed and configured to isolate a region of interest 44 on the optical article 3. The control unit 42 may then break up the region of interest 44 into a plurality of divided sub-regions 46 extending across the photochromic material of the optical article 3. In one embodiment or aspect of the present disclosure, the control unit 42 is programmed and configured to identify a sub-region 46 of the photochromic material that measures at least 5 millimeters in width and 5 millimeters in height. Each sub-region 46 may be square-shaped or rectangular-shaped. Each sub-region 46 in the region of interest 44 of the photochromic optical article 3 may have a different transmittance compared to the other sub-regions 46. Further, each corresponding sub-region of the photochromic material may have a different transmittance in the image of the optical article 3 taken before the photochromic material is activated and in the image of the optical article 3 taken after the photochromic material is activated. In one embodiment or aspect of the present disclosure, the photochromic material on the activated photochromic optical article 3 may have a linear gradient in which the top of the photochromic optical article is darkest at the top of the optical article 3 and lightest at the bottom of the optical article 3.

In one embodiment or aspect of the present disclosure, a method of determining the transmittance of the photochromic material on the photochromic optical article 3 is disclosed in U.S. Patent Application Publication No. 2021/0055217, filed Jun. 25, 2020, the disclosure of which is incorporated by reference in its entirety. Measurements of intensity of electromagnetic radiation over a desired range of wavelengths may be taken by the image capture device 36 over the one or more regions of interest 44 of the optical article 3. The one or more regions of interest 44 may be chosen randomly, or may correspond to portions of the optical article 3, the transmittance of light through which is desired to be measured.

As described in U.S. Patent Application Publication No. 2021/0055217, the image capture device 36 captures image data of the electromagnetic radiation transmitted through the optical article 3. The image capture device 36 is an intensity detection device and measures the intensity of electromagnetic radiation transmitted through one or more portions of the optical article 3. The intensity data, as a function of position, can be included in the image data taken by the image capture device 36. It is not necessary for the image capture device 36 to have a high resolution in order to measure the intensity of electromagnetic radiation transmitted through the optical article 3. However, it is preferable that the image capture device 36 possess good photometric linearity. It is further preferable that the image capture device 36 possess a high dynamic range. Examples of the image capture device 36 include digital cameras, charge-coupled devices (CCDs), complementary metal-oxide semiconductor (CMOS) sensors, photodiode arrays, photomultiplier arrays, or a single sensor (1.times.1 array) with optics to focus in on any given area size. An additional example of an image capture device 36 is a hyperspectral imager, wherein the image sensor at each pixel may take data over the entire spectrum of visible light, not just a narrowed band due to filters. The image capture device 36 may take images that are in color or black and white. An example of a suitable image capture device 36 to serve as an intensity measuring device is a model AVT F-145 B/C Stingray camera, commercially available from Allied Vision Technologies of Exton, Pa. Images taken using a High Dynamic Range ("HDR") function also may be used, provided that exposure times and dark values are known, and assuming a linear relationship between exposure time and measured intensity value.

Image data, including data on light intensity and position, can be stored in the internal memory of the image capture device 36. Alternatively, image data can be stored in a removable or external memory, or in any other manner known in the art.

The image capture device 36 may be configured to take image data that includes intensity data of one or more selected wavelengths or one or more wavelength ranges of electromagnetic radiation. For example, the image capture device 36 can be configured to take image data that includes intensity data of one or more selected wavelengths or one or more wavelength ranges of electromagnetic radiation within the range of 1 nm to 1,000 nm. For example, the image capture device 36 can be configured to take image data that includes intensity data of one or more selected wavelengths or one or more wavelength ranges of visible light. For example, the image capture device 36 may take data on the intensity of electromagnetic radiation in the red, green, and blue ranges. Alternatively or additionally, the image capture device 36 may take intensity data of electromagnetic radiation in the cyan, yellow, green, and/or magenta ranges. Other wavelength ranges also may be used. It will be understood by a skilled artisan that various manufacturers and imaging devices define these color ranges differently, and that specific wavelengths or wavelength ranges for each color, and some ranges, may overlap. Exemplary ranges for red, green, and blue are 635±20 nm, 555±20 nm, and 460±20 nm, respectively. Any range or combination of wavelength ranges in the visible light spectrum, which includes wavelengths between approximately 380-780 nm, may be used.

If the optical article 3 has photochromic properties, the first intensity measurement may be made with the optical article 3 in place in a first state. The first state can be a non-activated state. The second intensity measurement can be made with the image capture device 36 with the photochromic optical article 3 in a second state. The second state can be an activated state.

When capturing images with the image capture device 36, some of the measured intensity values may be partially-attributable to dark current on the image capture device 36. Dark current can be dependent on the temperature on the image capture device 36. The manufacturer of the image capture device 36 may provide a table or plot of intensity values on the image capture device 36 due to dark current. Intensity attributable to dark current at various temperatures can be determined by taking one or more measurements with the image capture device 36 while the shutter is closed. Temperature measurements can be taken with a temperature measuring device concurrently with measuring the first and second intensity values. The image capture device 36 may include a temperature measuring device, or an external temperature measuring device may be used.

When the image capture device 36 captures image data over all or at least a portion of the surface area of the optical article 3, intensity values from across the optical article 3 can be compared. Such a comparison is useful in that it allows for the identification in differences in transmittance across the optical article 3. This configuration also allows a user to map a gradient of transmittance in the optical article 3 having a photochromic gradient. In this circumstance, the region of interest 44 can correspond in size with the desired area of the optical article 3 to be measured.

Similarly, the second measurement of the intensity of electromagnetic radiation, e.g., visible light, transmitted through the optical article 3 is taken with the image capture device 36. The second measurement includes intensity data over the same reason of interest 44. The wavelength or range of wavelengths measured for the first measurement and the second measurement preferably are the same.

In order to compare intensity data between the first measurement and the second measurement, position data on the sub-region 46 is determined. A position on sub-region 46 between the two intensity measurements may be determined by comparing the shape of the sub-region 46 in each image. This may be accomplished by visually comparing the images and choosing a range of coordinates in each image to be analyzed. Additionally or alternatively, the reference surface may be overlaid with coordinates, such as x-y coordinates, or other identifying marks which may aid in determining position by comparison of image data between the first and second measurements in embodiments or aspects wherein the shape of the sub-region 46 is otherwise uniform. Software stored in the memory of the image capture device 36, in the control unit 42, or in an external computing device, may be applied by a processor to automatically compare the images in order to determine the sub-region 46 analyzed. A processor may be located in the image capture device 36 or in the control unit 42, or an external processor may be used.

As described above, some of the measured intensity values may be partially-attributable to dark current. Dark current can be dependent on the temperature in the housing 4, including the temperature of the image capture device 36. In one embodiment or aspect of the present disclosure, intensity attributable to dark current at various temperatures can be determined by taking one or more measurements with the image capture device 36 while the shutter mechanism 34 is closed. Temperature measurements can be taken with a temperature measuring device concurrently with measuring the first and second intensity values. The image capture device 36 may include a temperature measuring device, or an external temperature measuring device may be used.

In the first and second measurements, intensity data may be taken over a range of wavelengths, or for specific wavelengths. When comparing the data for the two measurements, the following equation may be applied:

$$T_{Meas} = \frac{(I_T - d)}{(I_O - d)}$$

where $T_{Meas}$ is the transmittance of electromagnetic radiation through the optical article 3;

$I_O$ is the measurement of the first intensity (i.e., non-activated state);

$I_T$ is the measurement of the second intensity (i.e., activated state); and d is the intensity value attributable to dark current on the intensity measuring device.

Measured absorbance $A_{Meas}$ of the optical article 3 is defined as $$\log_{10}\left(\frac{1}{T}\right).$$

It is to be understood that, for examples of region of interest 44 that transmit light in the desired wavelength range, the calculation of $T_{Meas}$ returns an accurate value for transmittance of the optical article 3. $T_{Meas}$ is a measurement of the difference in transmittance between the non-activated and activated state of the photochromic material on the optical article 3.

Exemplary software that may be used with the control unit 42 to analyze the intensity data includes Igor Pro, developed by WaveMetrics; Image J, developed by the National Institutes of Health; LabVIEW, developed by National Instruments; Origin and OriginPro, developed by OriginLab; and Microsoft Excel, developed by Microsoft Corporation. Additional software may perform analysis of intensity data, as known in the applicable art.

While various examples of the present disclosure were provided in the foregoing description, those skilled in the art may make modifications and alterations to these examples without departing from the scope and spirit of the disclosure. Accordingly, the foregoing description is intended to be illustrative rather than restrictive. The disclosure described hereinabove is defined by the appended claims, and all changes to the disclosure that fall within the meaning and the range of equivalency of the claims are to be embraced within their scope.

The invention claimed is:

1. An apparatus configured for determining transmittance of a photochromic optical article comprising at least one photochromic material, the apparatus comprising:

a housing defining an interior configured to receive the optical article, the housing comprising a holding member to hold the optical article at a predetermined position;

at least one source of actinic radiation configured to radiate actinic radiation into the interior of the housing and activate at least one photochromic material in the photochromic optical article;

at least one image capture device configured to capture still or video image data of the photochromic optical article;

at least one backlight positioned beneath the holding member to emit light towards the image capture device and through the optical article;

at least one ultraviolet filter positioned between the at least one source of actinic radiation and the holding member and in-line with the image capture device, the ultraviolet filter being reflective of at least a portion of wavelengths comprising the actinic radiation; and a controller operatively connected to the at least one image capture device and the at least one source of actinic radiation, wherein the controller is configured to determine transmittance of visible light through the photochromic optical article using the still or video image data captured by the image capture device.

2. The apparatus of claim 1, wherein the controller is configured to activate the at least one image capture device to capture at least one of a first image data prior to activation of the at least one photochromic material in the photochromic optical article, a second image data after the at least one photochromic material in the photochromic optical article is activated, and a third image data, by closing a shutter mechanism of the image capture device, either before or after the at least one photochromic material in the photochromic optical article has been activated.

3. The apparatus of claim 1, wherein the controller is configured to compare a first intensity in a first portion in a first image data captured by the image capture device before the at least one photochromic material in the photochromic optical article has been activated to a second intensity in the first portion in a second image data captured by the image capture device after the at least one photochromic material in the photochromic optical article has been activated.

4. The apparatus of claim 1, wherein the holding member is positioned in a temperature-controlled box defined in the interior of the housing, the temperature-controlled box further comprising at least one temperature control component, wherein the at least one temperature control component is configured to maintain a predetermined temperature within the temperature-controlled box.

5. The apparatus of claim 4, further comprising a temperature controller operatively connected to the at least one temperature control component, wherein the temperature controller is configured to set the predetermined temperature within the temperature-controlled box and set a temperature output of the at least one temperature control component.

6. The apparatus of claim 4, wherein the at least one temperature control component is configured to maintain a temperature in the range of −20 °C to 50 °C in the temperature-controlled box.

7. The apparatus of claim 1, wherein the holding member comprises a self-centering chuck configured to secure the optical article.

8. The apparatus of claim 4, wherein the holding member is positioned in a drawer that is movable into and out of the temperature-controlled box defined in the interior of the housing.

9. The apparatus of claim 1, wherein the at least one image capture device comprises at least one linear response camera.

10. The apparatus of claim 1, wherein the photochromic material in the photochromic optical article is present in a gradient pattern.

11. The apparatus of claim 1, wherein the controller is configured to measure and calculate transmittance of a plurality of sub-regions identified on the photochromic optical article.

12. A method of determining transmittance of an optical article having at least one photochromic property applied in a gradient pattern on at least one surface of the optical article using an apparatus according to claim 1, the method comprising:

capturing a first image data of a first portion of the gradient pattern on at least one surface of the optical article with at least one image capture device before the gradient pattern is activated;

irradiating at least the first portion of the gradient pattern of the optical article with actinic radiation from at least one source of actinic radiation to activate the gradient pattern in the at least one photochromic property;

capturing a second image data of the first portion of the gradient pattern on at least one surface of the optical article with at least one image capture device after the gradient pattern has been activated; and calculating, with a processor, the transmittance of visible light through the gradient pattern of the optical article by comparing the first image data to the second image data.

13. The method of claim 12, further comprising maintaining a temperature of a temperature-controlled box defined in the interior at a predetermined temperature using a temperature controller.

14. The method of claim 12, further comprising capturing a third image data using the image capture device when a shutter mechanism is closed on the image capture device.

* * * * *